(12) United States Patent
Hashimoto et al.

(10) Patent No.: US 6,333,280 B1
(45) Date of Patent: *Dec. 25, 2001

(54) FLAME-RETARDANT OR INCOMBUSTIBLE DECORATIVE LAMINATED SHEET

(75) Inventors: Osamu Hashimoto; Goro Tanaka; Tatsuya Hayashida, all of Fujieda (JP)

(73) Assignee: Sumitomo Bakelite Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,279

(22) PCT Filed: Sep. 3, 1997

(86) PCT No.: PCT/JP97/03082

§ 371 Date: Apr. 7, 1998

§ 102(e) Date: Apr. 7, 1998

(87) PCT Pub. No.: WO98/09816

PCT Pub. Date: Mar. 12, 1998

(30) Foreign Application Priority Data

Sep. 4, 1996 (JP) .................................... 8-234460
Oct. 3, 1996 (JP) .................................... 8-263372
Mar. 3, 1997 (JP) .................................... 9-047742
Mar. 3, 1997 (JP) .................................... 9-047743

(51) Int. Cl.[7] ............... B32B 5/16; B32B 27/12; B32B 17/02; B32B 17/04; B32B 5/26

(52) U.S. Cl. ................. 442/70; 442/136; 442/172; 442/180; 442/181; 442/247; 442/252; 442/255; 442/268; 428/328; 428/340; 428/920; 428/921

(58) Field of Search .................. 428/70, 206, 323, 428/328, 330, 340, 411.1, 426, 441, 500, 515, 506, 502, 688, 920, 921; 442/70, 136, 172, 176, 180, 181, 239, 246, 247, 251, 252, 255, 259, 268, 277, 278, 283, 284, 391, 412; 156/307.4

(56) References Cited

U.S. PATENT DOCUMENTS 4,170,508 * 10/1979 Wortmann et al. ............... 156/308

(List continued on next page.)

FOREIGN PATENT DOCUMENTS 53-121894 * 10/1978 (JP) .

(List continued on next page.)

*Primary Examiner*—Paul Thibodeau
*Assistant Examiner*—Sheeba Ahmed
(74) *Attorney, Agent, or Firm*—Smith, Gambrell & Russell, LLP

(57) ABSTRACT

The present invention provides a flame-retardant or non-flammable decorative sheet which is a one-piece laminate of the following materials:

one layer or two or more layers of a sheet material for a core layer, obtained by impregnating a base sheet material made of an inorganic fiber, with a composition comprising a phenolic resin and/or a melamine resin and aluminum hydroxide and/or magnesium hydroxide, the proportions of the former and the latter in the composition being 4–15% by weight and 96–85% by weight, respectively, and a sheet material for a decorative layer, placed on at least one side of the sheet material for the core layer. When the sheet material for the core layer consists of two or more layers, there can be interposed, between the layers of the sheet material for the core layer, a sheet material for a reinforcing layer obtained by impregnating a base sheet material made of an inorganic fiber, with a thermosetting resin. The present invention also provides a process for producing such a flame-retardant or nonflammable decorative sheet.

6 Claims, 3 Drawing Sheets

2 SHEET MATERIAL FOR DECORATIVE LAYER
5 SHEET MATERIAL FOR CORE LAYER
6 SHEET MATERIAL FOR REINFORCING LAYER
5 SHEET MATERIAL FOR CORE LAYER
3 SHEET MATERIAL FOR DECORATIVE LAYER
7 NONFLAMMABLE DECORATIVE SHEET

U.S. PATENT DOCUMENTS

| | | | | |
|---|---|---|---|---|
| 4,371,579 | * | 2/1983 | McCaskey et al. | 428/204 |
| 5,413,828 | * | 5/1995 | De Kayser | 428/36.5 |
| 5,460,864 | * | 10/1995 | Heitkamp | 428/116 |
| 5,486,408 | * | 1/1996 | Sentendrey | 428/220 |
| 5,500,480 | * | 3/1996 | Brown et al. | 524/437 |
| 5,552,185 | * | 9/1996 | De Keyser | 427/358 |
| 5,583,172 | * | 12/1996 | Imahashi et al. | 524/435 |
| 5,669,799 | * | 9/1997 | Moseneder et al. | 442/374 |
| 5,882,467 | * | 3/1999 | Sierawski et al. | 156/329 |

FOREIGN PATENT DOCUMENTS

| | | |
|---|---|---|
| 53-121894A | 10/1978 | (JP) . |
| 56-9423B2 | 3/1981 | (JP) . |
| 60-26994A | 2/1985 | (JP) . |
| 64-56540 | 3/1989 | (JP) . |
| 6-24822B2 | 4/1994 | (JP) . |
| 7-115438B2 | 12/1995 | (JP) . |

* cited by examiner

FLAME-RETARDANT OR INCOMBUSTIBLE DECORATIVE LAMINATED SHEET

TECHNICAL FIELD

The present invention relates to a flame-retardant or nonflammable decorative sheet used in various applications mainly as an interior material.

BACKGROUND ART

Many conventional flame-retardant or nonflammable decorative sheets are made of inorganic materials and have various problems in processability, impact resistance, health safety due to the presence of asbestos, etc. However, decorative sheets made of organic resins cause severe heat generation and fuming when burned; are low in shape retainability after combustibility tests (the surface combustibility test and the material combustibility test both according to Notification No. 1828 of the Ministry of Construction; hereinafter referred to also as noncombustibility tests); and have been unreliable as a flame-retardant or nonflammable decorative sheet.

Under the above situation, the present invention provides a flame-retardant or nonflammable decorative sheet excellent in flame retardancy or nonflammability and low in dimensional change, warpage deformation, etc.

DISCLOSURE OF THE INVENTION

The present invention relates to:

a flame-retardant or nonflammable decorative sheet which is a one-piece laminate of the following materials:
- one or more layers of a sheet material as a core layer, obtained by impregnating a base sheet material made of an inorganic fiber, with a composition comprising a phenolic resin and/or a melamine resin and aluminum hydroxide and/or magnesium hydroxide, the proportions of the former and the latter in the composition being 4–15% by weight and 96–85% by weight, respectively, and
- a sheet material as a decorative layer, placed on at least one side of the sheet material as the core layer. The invention further relates to:
  - a flame-retardant or nonflammable decorative sheet which is a one piece-laminate of the following materials:
    - two or more layers of a sheet material as a core layer, obtained by impregnating a base sheet material made of an inorganic fiber, with a composition comprising a phenolic resin and/or a melamine resin and aluminum hydroxide and/or magnesium hydroxide, the proportions of the former and the latter in the composition being 4–15% by weight and 96–85% by weight, respectively,
    - a sheet material as a reinforcing layer, obtained by impregnating a base sheet material made of an inorganic fiber, with a thermosetting resin, the sheet material being interposed between the two or more layers of the sheet material as the core layer, and
    - a sheet material as a decorative layer, placed on at least one side of the sheet material as the core layer.

DETAILED DESCRIPTION OF THE INVENTION

Figure 1:
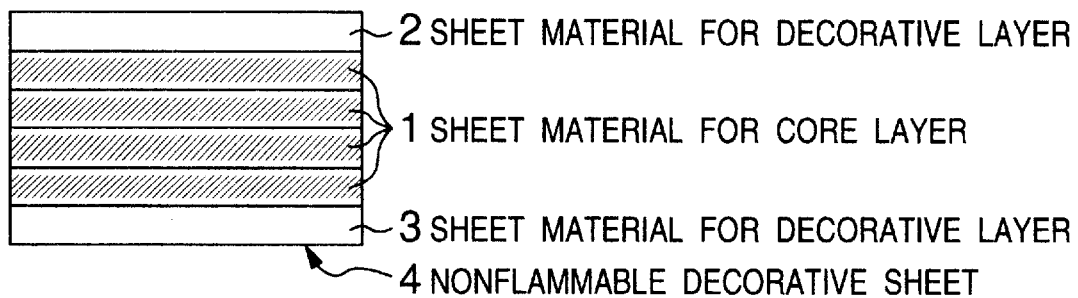
FIG. 1 is a sectional view of a nonflammable decorative sheet 4 comprising a sheet material 1 for core layer and sheet materials 2 and 3 for decorative layer, laminated on the both sides of the sheet material 1 for core layer.
Figure 2:
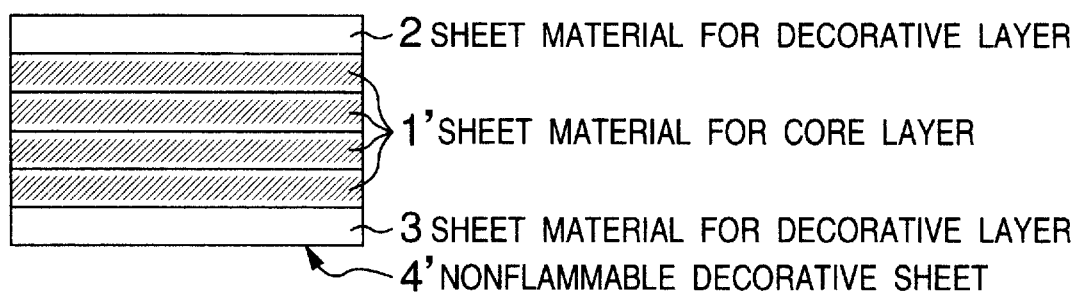
FIG. 2 is a sectional view of a nonflammable decorative sheet 4' comprising a sheet material 1' for core layer and sheet materials 2 and 3 for decorative layer, laminated on the both sides of the sheet material 1' for core layer.
Figure 3:
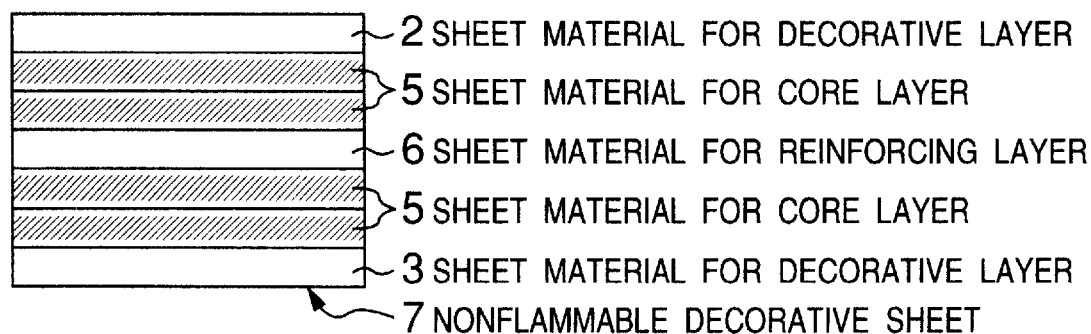
FIG. 3 is a sectional view of a nonflammable decorative sheet 7 comprising a sheet material 5 for core layer, a sheet material 6 for reinforcing layer, interposed between the sheet material 5 for core layer, and sheet materials 2 and 3 for decorative layer, laminated on the both sides of the sheet material 5 for core layer.
Figure 4:
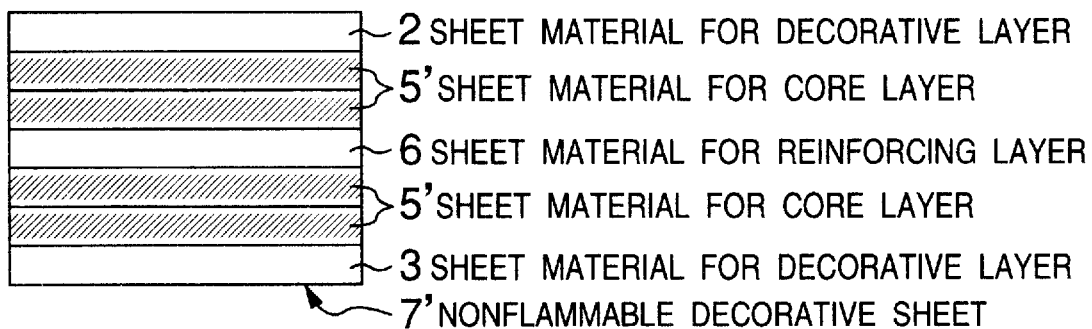
FIG. 4 is a sectional view of a nonflammable decorative sheet 7' comprising a sheet material 5' for core layer, a sheet material 6 for reinforcing layer, interposed between the sheet material 5' for core layer, and sheet materials 2 and 3 for decorative layer, laminated on the both sides of the sheet material 5' for core layer.
Figure 5:
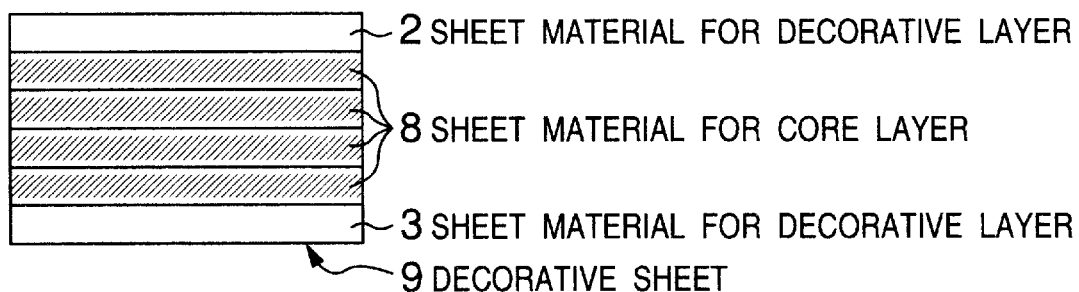
FIG. 5 is a sectional view of a decorative sheet 9 for comparison, comprising a sheet material 8 for core layer and sheet materials 2 and 3 for decorative layer, laminated on the both sides of the sheet material 8 for core layer.
Figure 6:
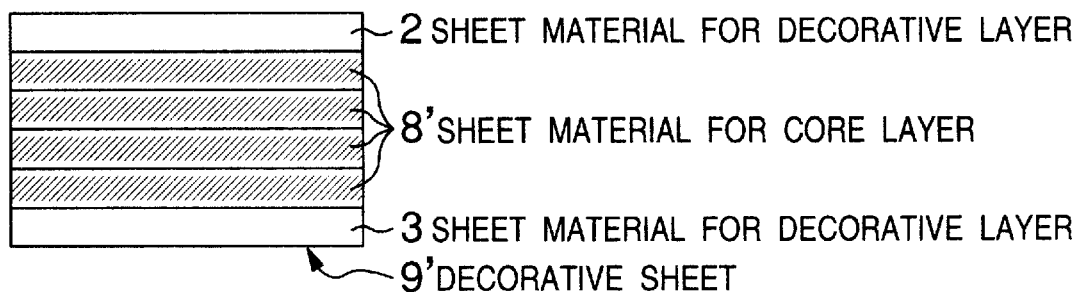
FIG. 6 is a sectional view of a decorative sheet 9' for comparison, comprising a sheet material 8' for core layer and sheet materials 2 and 3 for decorative layer, laminated on the both sides of the sheet material 8' for core layer.

In the present invention, there is no particular restriction with respect to the base sheet material made of an inorganic fiber. However, in order to coat the base sheet material with a composition comprising a phenolic resin and/or a melamine resin and aluminum hydroxide and/or magnesium hydroxide to impregnate them into the interior of the base sheet material, the preferred base sheet material is a glass fiber nonwoven fabric, particularly a glass fiber nonwoven fabric having a basic weight of 30–100 g/m$^2$. When the basic weight is less than 30 g/m$^2$, the glass fiber nonwoven fabric has an insufficient strength and may have handling problems during impregnation of the composition into the glass fiber nonwoven fabric, molding or the like. When the basic weight exceeds 100 g/m$^2$, the adhesion between layers may be insufficient during molding.

The base sheet material is made of an inorganic fiber and used in the sheet material as a reinforcing layer. This is obtained by impregnating the base sheet material with a thermosetting resin. The preferred material is a glass nonwoven fabric having a basis weight of 30–100 g/m$^2$ or a glass woven fabric having a basis weight of 45–220 g/m$^2$. As the thermosetting resin, a melamine resin, a phenolic resin or the like can be used, and there is no particular restriction. However, a melamine resin is preferred in view of flame retardancy or nonflammability.

The composition comprising a phenolic resin and/or a melamine resin and aluminum hydroxide and/or magnesium hydroxide consists of 4–15% by weight of phenolic resin and/or melamine resin and 96–85% by weight of aluminum hydroxide and/or magnesium hydroxide. Therefore, the resulting decorative sheet has excellent flame retardancy, particularly when the phenolic resin is 8% by weight or less or the melamine resin is 10% by weight or less. The resulting decorative sheet meets Notification No. 1828 of the Ministry of Construction, i.e. "DESIGNATION OF NONCOMBUSTIBLE MATERIALS". When the phenolic resin and/or the melamine resin is less than 4% by weight, these resins are unable to fully act as a binder. As a result, there is a problem in interlaminar strength during the handling of sheet material for core layers and after molding.

As for the phenolic resin, ordinarily, used is a resol type phenolic resin, formed by using ammonia or an amine type catalyst such as triethylamine or the like. However, the phenolic resin is not restricted thereto.

As for the melamine resin, ordinarily used is a melamine resin whose formaldehyde/melamine molar ratio (hereinafter referred to simply as molar ratio) is 1.5–4.0. However, the molar ratio is not restricted to the above range. The molar ratio is preferably 1.5–3.0 in view of fuming tendency, storability of resin varnish, etc. An acidic curing agent can be added if necessary.

With respect to the aluminum hydroxide and/or the magnesium hydroxide, it is preferable that particles of large diameters and particles of small diameters are used in combination and in closest packing. Use of small-diameter particles alone can ensure uniformity, of a sheet material for core layer or a decorative sheet, but causes a problem during the mixing operation of the composition. Use of large-diameter particles alone causes a problem in handling of the resulting sheet material for the core layer and further invites reduction in nonflammability, caused by decrease in surface area of the particles. By using the aluminum hydroxide and/or the magnesium hydroxide having different particle diameters, in closest packing, the resulting composition can have improved saturation ability in production of a sheet material for the core layer. Various improvements are obtained in the mixing operation of the composition, handling of the resulting sheet, nonflammability of the sheet, etc.

In order to conduct the closest packing effectively, it is preferred that the particles of large diameters have an average particle diameter of 50–200 $\mu$m, the particles of small diameters have an average particle diameter of 1–30 $\mu$m, the total amount of the two kinds of particles is 50% by weight or more of the total filler amount, the ratio of the particle diameters of the two kinds of particles is 6 or more, and the compounding ratio of the two kinds of particles is 25:75 to 75:25. When the particle diameter ratio is smaller than 6 (the difference in particle diameters is small), the gap (volume) between particles is larger, the apparent density of resin/filler composition is smaller, and the bonding strength of resin is less. A compounding ratio deviating from the range of 25:75 to 75:25 is not preferred for flame retardancy or non-flammability, because the surface area of particles is larger or the apparent density of the composition is smaller because of the increase of gap between particles and the resin is required in a larger amount. Keeping the resin amount is not preferred from the productional standpoint.

When the particles of small diameters have an average particle diameter of less than 1 $\mu$m or when only particles of small diameters are used, the efficiency of mixing operation of the composition to be obtained is low, which is undesirable. When the particles of large diameters have an average particle diameter of more than 200 $\mu$m or when only particles of large diameters are used, the handling of the resulting sheet material for core layer is difficult. Furthermore, there is reduction in nonflammability, caused by the decrease in the surface area of particles. By using two or more kinds of aluminum hydroxide and/or magnesium hydroxide each having different particle diameters as mentioned above, in closest packing, the resulting composition can have improved bonding strength of resin in production of sheet material for core layer. Moreover, various improvements are obtained in the mixing operation of the composition, handling of the resulting sheet material, nonflammability of the sheet material, etc.

The composition is used as such or by diluting it with water, an organic solvent (e.g. alcohol) or the like. When the composition is impregnated into a base sheet material made of an inorganic fiber, the impregnation is carried out by diluting the composition 9- to 30-fold by weight. When the dilution ratio is less than 9-fold, no sufficient adhesion or surface finish is obtained in some cases. When the dilution ratio is more than 30-fold, the resulting sheet material for core layer has problems such as easy breakage and the like during its handling.

A preferred method consists of coating one side of a long base sheet material made of an inorganic fiber, with a thermosetting resin composition composed of aluminum hydroxide and/or magnesium hydroxide filler and then, ordinarily, heat-drying the resulting material for impregnation to produce a sheet material for the core layer. In this case, the composition is diluted with water, an organic solvent or the like so that the content of the filler in the composition becomes 70–90% by weight, whereby the composition has a high viscosity suitable for coating.

Figure 7:
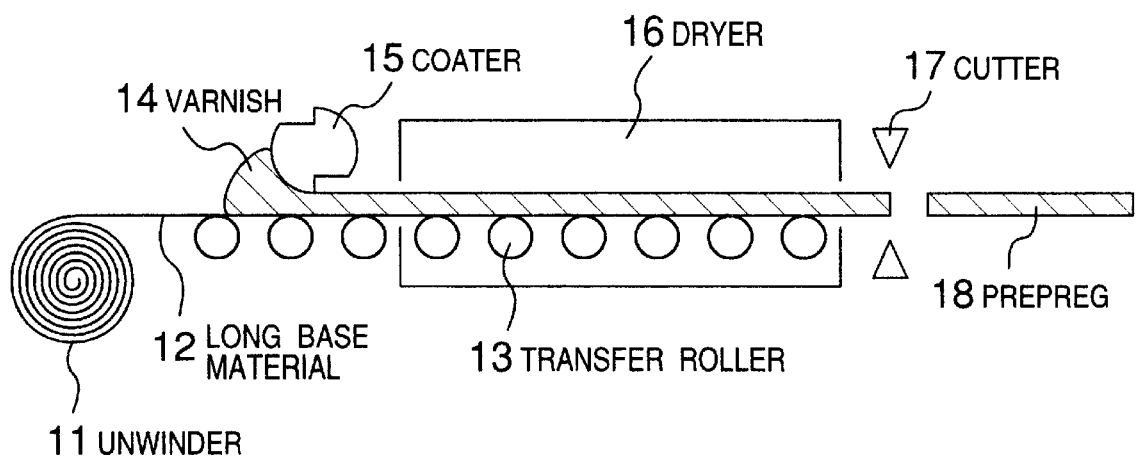
FIG. 7 is a schematic sectional view showing a step used in the production of a decorative sheet of the present invention, for producing a sheet material for core layer.

A description is made on the general practice of the above coating step with reference to FIG. 7 (a schematic sectional drawing).

A long base material 12 unwound from an unwinder 11 is transferred by a transfer roller 13. During the transfer, the upper side of the long base material 12 is coated with a thermosetting resin varnish 14 containing an inorganic filler, by a coater 15, so as to give a desired film thickness. The long base material is not restricted to glass fiber woven fabric, glass fiber nonwoven fabric or the like, but glass fiber woven or nonwoven fabric is preferred in the matter of flame resistance.

As for the coater 15, a comma roll coater, a knife coater, a die coater, a reverse coater or the Like can be used. However, since the thickness of the film formed is as large as 0.3–2.0 mm and accordingly the composition applied needs to have a high viscosity, a coater suitable for such a high-viscosity composition, such as comma roll coater, knife coater or the like is preferred.

After the long base material has been coated with a thermosetting resin composition containing an inorganic filler, the coated long base material is passed through a dryer 16 to vaporize the water or solvent of the composition, to obtain a sheet material (prepreg) 18 for the core layer. The heat-drying conditions vary depending upon the amount of resin in the composition, the kind and amount of volatile substance in the composition and the thickness of the composition applied, but are generally 100–160° C. and about 5–15 minutes. After the drying, the prepreg 18 is cut in a desired length by a cutter 17. Or, the prepreg may be used for continuous molding without being cut.

Next, as for the sheet material for the decorative layer placed on the face of the sheet material for core layer, generally used is a sheet material obtained by impregnating a fibrous base sheet material for the decorative layer with a thermosetting resin. Preferably, used is an impregnated sheet or paper obtained by impregnating a sheet or paper of 40–120 g/m$^2$ basic weight made of a pulp, a linter, a synthetic fiber, a glass fiber or the like, with a mixture comprising 60–95% of a melamine resin and 40–5% of aluminum hydroxide or magnesium hydroxide or silica. The degree of impregnation with the mixture is generally 100–400% by weight based on the sheet or paper.

The sheet material for decorative layer is placed on one side of the sheet material for core layer and they are made into a one-piece laminate. In order to prevent warpage, etc., it is preferable to use a sheet material equivalent to the above sheet material for the decorative layer, also on the other side of the sheet material for core layer. Desirably, the total thickness of the sheet materials placed on one or both sides of the sheet material for core layer is 0.5 mm or less and the content of organic substance in the sheet material(s) for decorative layer is 300 g/m² or less. When these ranges are not met, it is difficult for the resulting decorative sheet to pass the noncombustibility tests. Also when the final decorative sheet has a total thickness of less than 3 mm, it may be difficult for the decorative sheet to pass the noncombustibility tests.

The thus-produced sheet material for the core layer is used in one sheet or a number of laminated sheets. On one or both sides the sheet material for the decorative layer or its equivalent sheet is placed. They are heat-pressed and molded into a flame-retardant or nonflammable decorative sheet as in the present invention. During the molding process, a mirror-finish sheet, an embossed sheet, an embossed film or the like is laminated, whereby the final product has a surface of mirror-finish, embossed finish or the like.

In the present invention, preferred embodiments are:
a nonflammable decorative sheet which is a one-piece laminate of the following materials:
one or more layers of a sheet material for a core layer, obtained by impregnating a base sheet material made of an inorganic fiber, with a composition comprising a phenolic resin and aluminum hydroxide, the proportions of the former and the latter in the composition being 4–8% by weight and 96–92% by weight, respectively, and
a sheet material for decorative layer having a thickness of 0.5 mm or less and an organic substance content of 300 g/m² or less, the sheet material being placed on at least one side of the sheet material for the core layer; and
a nonflammable decorative sheet which is a one-piece laminate of the following materials:
two or more layers of a sheet material for a core layer, obtained by impregnating a base sheet material made of an inorganic fiber, with a composition comprising a phenolic resin and aluminum hydroxide, the proportions of the former and the latter in the composition being 4–8% by weight and 96–92% by weight, respectively,
a sheet material for a reinforcing layer, obtained by impregnating a base sheet material made of an inorganic fiber, with a melamine resin, the sheet material being interposed between the two or more layers of the sheet material for the core layer, and
a sheet material for decorative layer having a thickness of 0.5 mm or less and an organic substance content of 300 g/m² or less, the sheet material being placed on at least one side of the sheet material for the core layer. These decorative sheets pass the above-mentioned noncombustibility tests and have excellent nonflammability.

BEST MODE FOR CARRYING OUT THE INVENTION

The present invention is described specifically below by way of Examples and Comparative Examples.

Example 1

(FIG. 1)

A glass fiber nonwoven fabric having a basis weight of 75 g/m², a specific gravity of 0.23 g/cm³ and an organic binder content of 11% was impregnated with a composition of 92% by weight of aluminum hydroxide (a mixture of 46% by weight of aluminum hydroxide having an average particle diameter of 160 μm and 46% by weight of aluminum hydroxide having an average particle diameter of 10 μm) and 8% by weight of a resol type phenolic resin, to obtain sheet materials 1 for the core layer wherein the degree of impregnation was 20-fold. Next, a decorative base sheet as construction material having a basis weight of 80 g/m² was impregnated with a melamine resin containing a curing agent, to produce a sheet material 2 for decorative layer wherein the degree of impregnation was 100%. Also, a decorative base sheet as construction material having a basis weight of 60 g/m² was impregnated with a melamine resin containing a curing agent, to produce a sheet material 3 for decorative layer wherein the degree of impregnation was 115%.

Four sheet materials 1 for core layer were laminated; on one side of the resulting laminate was placed one sheet material 2 for a decorative layer; on the other side of the laminate was placed one sheet material 3 for a decorative layer; and the resulting material was molded at 140° C. at 100 kg/cm² for 20 minutes to obtain a nonflammable decorative sheet 4 having a thickness of 3.5 mm.

Example 2

(FIG. 2)

A glass fiber nonwoven fabric having a basis weight of 75 g/m², a specific gravity of 0.23 g/cm³ and an organic binder content of 11% was impregnated with a composition of 92% by weight of aluminum hydroxide (a mixture of 46% by weight of aluminum hydroxide having an average particle diameter of 160 μm and 46% by weight of aluminum hydroxide having an average particle diameter of 10 μm) and 8% by weight of a methyl-etherified melamine resin of 2.5 molar ratio containing a curing agent, to obtain sheet materials 1' for core layer wherein the degree of impregnation was 20-fold. Next, a decorative base sheet as construction material having a basis weight of 80 g/m² was impregnated with a melamine resin containing a curing agent, to produce a sheet material 2 for decorative layer wherein the degree of impregnation was 100%. Also, a decorative base sheet as construction material having a basis weight of 60 g/m² was impregnated with the same melamine resin as mentioned above, to produce a sheet material 3 for decorative layer wherein the degree of impregnation was 115%.

Four sheet materials 1' for the core layer were laminated; on one side of the resulting laminate was placed one sheet material 2 for a decorative layer; on the other side of the laminate was placed one sheet material 3 for a decorative layer; and the resulting material was molded under the same conditions as employed in Example 1, to obtain a nonflammable decorative sheet 4' having a thickness of 3.5 mm.

Example 3

(FIG. 3)

On a long glass fiber nonwoven fabric having a basis weight of 75 g/m², a specific gravity of 0.23 g/cm³ and an organic binder content of 11% was coated, by the use of a comma roll coater, a composition of 95% by weight of aluminum hydroxide (a mixture of 25% by weight of aluminum hydroxide having an average particle diameter of 100 μm and 75% by weight of aluminum hydroxide having an average particle diameter of 8 μm) and 5% by weight of a resol type phenolic resin (the composition had a volatile content of about 15% by weight when prepared) so that the thickness of the resulting film became 1.15 mm after drying. The resulting material was heat-dried for impregnation, to obtain sheet materials 5 for a core layer wherein the degree of impregnation was 20-fold. Next, a glass woven fabric having a basis weight of 210 g/m$^2$ and an organic binder content of 0.08% was impregnated with a melamine resin containing a curing agent, to obtain a sheet material 6 for a reinforcing layer wherein the degree of impregnation was 40%. This sheet material 6 for a reinforcing layer was inserted between the second and third sheets of four laminated sheet materials 5 for a core layer. In the same manner as in Example 1, on one side of the resulting laminate was placed the sheet material 2 for a decorative layer, and on the other side of the laminate was placed the sheet material 3 for a decorative layer. The resulting material was molded under the same heat and pressure conditions as employed in Example 1, to obtain a nonflammable decorative sheet 7 having a thickness of 3.6 mm.

Example 4

(FIG. 4)

A long glass fiber nonwoven fabric having a basis weight of 75 g/m$^2$, a specific gravity of 0.23 g/cm$^3$ and an organic binder content of 11% was coated, by the use of a comma roll coater, with composition of 95% by weight of aluminum hydroxide (a mixture of 25% by weight of aluminum hydroxide having an average particle diameter of 100 μm and 75% by weight of aluminum hydroxide having an average particle diameter of 8 μm) and 5% by weight of the same melamine resin as used in Example 2 (the composition had a volatile content of about 15% by weight when prepared) so that the thickness of the resulting film became 1.15 mm after drying. The resulting material was heat-dried for impregnation, to obtain sheet materials 5' for core layer wherein the degree of impregnation was 20-fold. Next, a glass woven fabric having a basis weight of 210 g/m$^2$ and an organic binder content of 0.08% was impregnated with the same melamine resin containing a curing agent as mentioned above, to obtain a sheet material 6 for a reinforcing layer wherein the degree of impregnation was 40%. This sheet material 6 for a reinforcing layer was inserted between the second and third sheets of four laminated sheet materials 5' for a core layer. In the same manner as in Example 2, on one side of the resulting laminate was placed the sheet material 2 for a decorative layer, and on the other side of the laminate was placed the sheet material 3 for a decorative layer. The resulting material was molded under the same heat and pressure conditions as employed in Example 3, to obtain a nonflammable decorative sheet 7' having a thickness of 3.6 mm.

Comparative Example 1

(FIG. 5)

A glass fiber nonwoven fabric having a basis weight of 75 g/m$^2$, a specific gravity of 0.23 g/cm$^3$ and an organic binder content of 11% was impregnated with a composition of 80% by weight of aluminum hydroxide having an average particle diameter of 10 μm and 20% by weight of a resol type phenolic resin, to obtain sheet materials 8 for core layer wherein the degree of impregnation was 20-fold. Four sheet materials 8 for a core layer were laminated; on one side of the resulting laminate was placed the same sheet material 2 for a decorative layer as used in Example 1; on the other side of the laminate was placed the same sheet material 3 for a decorative layer as used in Example 1; and the resulting material was molded under the same heat and pressure conditions as employed in Example 1, to obtain a decorative sheet 9 having a thickness of 3.5 mm.

Comparative Example 2

(FIG. 6)

A glass fiber nonwoven fabric having a basis weight of 75 g/m$^2$, a specific gravity of 0.23 g/cm$^3$ and an organic binder content of 11% was coated with a composition of 80% by weight of aluminum hydroxide having an average particle diameter of 10 μm and 20% by weight of the same melamine resin as used in Example 1, to obtain sheet materials 8' for core layer wherein the degree of impregnation was 20-fold. Four sheet materials 8' for a core layer were laminated; on one side of the resulting laminate was placed the same sheet material 2 for a decorative layer as used in Example 1; on the other side of the laminate was placed the same sheet material 3 for a decorative layer as used in Example 1; and the resulting material was molded under the same heat and pressure conditions as employed in Example 2, to obtain a decorative sheet 9' having a thickness of 3.5 mm.

The nonflammable decorative sheets 4, 4', 7 and 7' obtained in Examples and the decorative sheets 9 and 9' obtained in Comparative Examples were measured for properties. The results are shown below.

|  | Examples | | | | Comp. Examples | |
| --- | --- | --- | --- | --- | --- | --- |
|  | 1 | 2 | 3 | 4 | 1 | 2 |
| Material compustibility test | Pass | Pass | Pass | Pass | Fail | Fail |
| Surface combustibility test | | | | | | |
| 1 | No | No | No | No | No | No |
| 2 | No | No | No | No | No | No |
| 3 | No | No | No | No | No | No |
| 4 | 0 | 0 | 0 | 0 | 0 | 0 |
| 5 | 15 | 13 | 12 | 11 | 30 | 28 |
| Rating | Pass | Pass | Pass | Pass | Pass | Pass |
| Overall rating | Pass | Pass | Pass | Pass | Fail | Fail |

(Test method)

Material combustibility test:

Was conducted in accordance with Notification No. 1828 of the Ministry of Construction.

Surface combustibility test:

Was conducted in accordance with Notification No. 1828 of the Ministry of Construction.

Rating 1:

None of deformation damaging the fire resisting property of specimen, generation of gases extremely hazardous to escape, etc. shall be observed.

Rating 2:

Neither melting through the full thickness of specimen, nor cracks reaching the back side of specimen having a width of 1/10 or more of the full thickness shall be observed.

Rating 3:
No flame remaining for 30 seconds or longer after the end of heating shall be observed.

Rating 4:
The exhaust temperature curve [a curve to be recorded by the thermometer described in item 3 (2)] of specimen shall not exceed a standard temperature curve [a curve connecting the values to be obtained by adding 50 degrees to the exhaust temperatures at one minute intervals after adjusting the furnace as provided in item 2 (1) (d)].

Rating 5:
The smoke generation coefficient $C_A$ per unit area to be obtained by the following formula shall not exceed 30.

$$C_A = 24 \log_{10} I_o / I$$

where
$I_o$: initial intensity of the light beam at the start of the heating test (in lux), and
$I$: minimum intensity of the light beam during the heating test (in lux).

As made clear from the foregoing Examples, the flame-retardant or nonflammable decorative sheet according to the present invention is formed by placing a decorative layer or its equivalent layer on one side or both sides of a sheet material for core layer obtained by impregnating a base sheet material (e.g. a nonwoven fabric made of an inorganic fiber such as glass fiber or the like) with a composition comprising a phenolic resin and/or a melamine resin and aluminum hydroxide and/or magnesium hydroxide (the resin content is 15% by weight or less) and molding them into one piece; therefore, in the present decorative sheet, the amounts of heat and smoke generated during combustion are controlled at very low levels.

Particularly when the present decorative sheet is formed by placing a decorative layer or its equivalent layer each having a thickness of 0.5 mm or less and an organic substance content of 300 g/m² or less, on one side or both sides of a sheet material for core layer obtained by coating, on a base sheet material such as the above-mentioned nonwoven fabric or the like, a composition comprising a phenolic resin and/or a melamine resin and aluminum hydroxide and/or magnesium hydroxide (the melamine resin content is 10% by weight or less or the phenolic resin content is 8% by weight or less) and molding them into one piece, the amounts of heat and smoke generated during combustion are controlled at very low levels and, moreover, there is substantially no destruction of sheet shape after combustion; therefore, the present decorative sheet can be recognized as a noncombustible material meeting Notification No. 1828 of the Ministry of Construction.

Further in the present decorative sheet, there can be used, for the decorative layer, any of the same sheet materials for decorative layer as used in conventional decorative sheets; therefore, the present decorative sheet can be used as a flame-retardant or nonflammable material for various applications by appropriately selecting the decorative layer from a variety of colors and patterns.

INDUSTRIAL APPLICABILITY

Thus, the decorative sheet of the present invention has excellent flame retardancy or non-flammability and therefore can be used as a flame-retardant or nonflammable material in various applications such as houses and the like.

What is claimed is:

1. A nonflammable, laminate decorative sheet material, comprising:
    a core layer, comprising at least two layers of a core layer sheet material obtained by impregnating an inorganic fiber nonwoven fabric with a composition comprising:
        a phenolic resin, comprising 4–8% by weight, and aluminum hydroxide, comprising 92–96% by weight, based on the weight of said composition;
    a reinforcing layer, interposed between at least two of said at least two layers of core layer sheet material, said reinforcing layer being obtained by impregnating an inorganic fiber woven fabric with a melamine resin; and
    at least one decorative layer, having a thickness of 0.5 mm or less and an organic substance content of 300 g/m² or less, positioned on at least one side of said core layer.

2. The nonflammable, laminate decorative sheet material according to claim 1, wherein said aluminum hydroxide comprises two kinds of particles having different particle diameters:
    a first kind of aluminum hydroxide particles having an average particle diameter of from 50–200 μm, and
    a second kind of aluminum hydroxide particles having an average particle diameter of from 1–30 μm;
    wherein a ratio of the average particle diameter of the first kind with respect to the average particle diameter of the second kind is at least 6;
    wherein a compounding ratio of the first kind of particles with respect to the second kind of particles is between 25:75 and 75:25; and
    wherein a total amount of said two kinds of particles comprises at least 50% by weight of a total amount of said aluminum hydroxide present.

3. The nonflammable, laminate decorative sheet material according to claim 1, wherein said inorganic fiber nonwoven fabric which forms a core layer sheet material comprises a glass fiber nonwoven fabric having a basic weight of 30–100 g/m².

4. The nonflammable, laminate decorative sheet material according to claim 1, wherein said inorganic fiber woven fabric which forms a reinforcing layer comprises a glass fiber woven fabric having a basis weight of 45–220 g/m².

5. The nonflammable, laminate decorative sheet material according to claim 1,
    wherein the core layer sheet material comprises a glass fiber nonwoven fabric impregnated with a composition comprising 95% by weight aluminum hydroxide and 5% by weight of a resol phenolic resin,
    wherein the reinforcing layer comprises a glass fiber woven fabric impregnated with a melamine resin, and
    wherein the at least one decorative layer comprises two decorative layers, provided as the outer layers of the laminate sheet material, impregnated with melamine.

6. A process of producing the nonflammable, laminate decorative sheet material according to claim 5, the process comprising:
    coating at least two sheets of glass fiber nonwoven fabric with a composition comprising 95% by weight aluminum hydroxide and 5% by weight of a resol phenolic resin to produce at least two sheets of core layer sheet material;
    impregnating a glass woven fabric with a melamine resin to obtain a reinforcing layer;
    interposing the reinforcing layer between at least two of said at least two layers of core layer sheet material;
    positioning two decorative layers as the outer layers of the laminate decorative sheet material; and
    molding at 140° C. at 100 kg/cm² for 20 minutes to obtain a nonflammable, laminate decorative sheet material.

* * * * *